United States Patent [19]

Palmer et al.

[11] 3,873,736

[45] Mar. 25, 1975

[54] SEMI-MOIST MEAT RESEMBLING FOOD PRODUCT AND METHOD OF PREPARATION

[76] Inventors: Hugh Charles Palmer; Derek Horrocks; Keith Buckley, all of Melton Mowbray, Leicestershire, England

[22] Filed: Apr. 19, 1972

[21] Appl. No.: 245,626

[30] Foreign Application Priority Data
Apr. 20, 1971 United Kingdom........ 10214/71

[52] U.S. Cl.................... 426/92, 426/241, 426/249, 426/250, 426/328, 426/332, 426/364, 426/802
[51] Int. Cl.............................. A23l 1/31, A23j 3/00
[58] Field of Search............ 99/14, 17, 18, 20, 108, 99/2 R, 157; 426/104, 332, 241, 249, 92, 151, 250, 328, 331, 364, 802

[56] References Cited
UNITED STATES PATENTS

| | | | |
|---|---|---|---|
| 3,047,395 | 7/1962 | Rusoff et al. | 99/14 |
| 3,202,514 | 8/1965 | Burgess et al. | 99/108 X |
| 3,210,195 | 10/1965 | Kjelson et al. | 99/14 |
| 3,271,552 | 9/1966 | Krajewski | 99/108 UX |
| 3,320,070 | 5/1967 | Hartman | 99/17 |
| 3,343,963 | 9/1967 | Kjelson | 99/14 |
| 3,365,297 | 1/1968 | Burgess et al. | 99/2 |
| 3,482,985 | 12/1969 | Burgess et al. | 99/14 X |
| 3,644,121 | 2/1972 | Boyer et al. | 99/14 X |

*Primary Examiner*—James R. Hoffman
*Attorney, Agent, or Firm*—Davis, Hoxie, Faithfull & Hapgood

[57] ABSTRACT

The invention relates to a semi-moist protein food product of meaty and other materials having an elastic texture resembling that of natural meat. The product of the invention contains the water-soluble substances necessary to stabilize moist foods against microbiological spoilage and sufficient heat-coagulated protein, preferably wheat gluten, to confer the desired solidity and elasticity on the product. The product can be made by adding a heat-coagulable protein to a mix of pasteurised meats and water-soluble substances and then raising the temperature to coagulate the protein and form a solid product. The product can be cut into chunks while hot and retains its integrity, and can be sprayed or coated with oils or stabilized solutions of flavourings, humectants or antimycotics.

15 Claims, No Drawings

SEMI-MOIST MEAT RESEMBLING FOOD PRODUCT AND METHOD OF PREPARATION

The present invention relates to food products containing meat or meat by-products or other proteinaceous material and having a relatively soft, moist character. It relates more especially to such products which are suitable for feeding to animals, notably domestic pets.

It is known to prepare so-called "semi-moist" or "soft-moist" food products which comprise meaty materials and have moisture contents lying between those of dry foods and canned foods, by which latter is here meant wet meat containing foods which require canning for their preservation. Typical moisture contents for such foods are from 20 to 25% by weight and the products are preserved from bacterial attack by the inclusion of sufficient water-soluble material to exert a bacteriostatic effect. A typical water-soluble material used for this purpose is sugar which may be present in an amount of between 15 and 35% of the total weight of the food. One example of such a product is described in British patent specification No. 1,043,585.

Such known semi-moist products commonly resemble minced meat or hamburgers in appearance and texture and do not possess the coherent, elastic, soft texture of raw meat. Furthermore, although it is known that products of high moisture content have enhanced animal acceptance (that is they are more readily eaten by the appropriate animal), known semi-moist products have been formulated with relatively low moisture contents since at higher moisture levels the products have been too soft and incapable of retaining their shape.

Semi-moist compositions have been proposed in which cold-setting materials are incorporated to give products which are more solid when cold. In British patent specification No. 1,143,373 a marbled meat animal food is described which comprises red and white semi-moist portions, separately formed by cooking-extrusion, the white portion being randomly distributed in the red and the red portion or both portions containing 7.5 to 25% sodium caseinate, to cause tackiness at temperatures above 120° F (49° C), and 0.5 to 10% starch. In British patent specification No. 1,217,662 it is proposed to prepare an animal food by adding at least 5% ungelatinised starch to a pasteurised meat slurry, adding stabilising solutes acidifying to a pH less than 6.0, subjecting the mixture to heat and agitation to gelatinise the starch and extruding and cooling the composition. In both these foods the effect of the caseinate and the starch respectively is to increase the solidity of the cold product, but at elevated temperatures they provide a viscous or tacky and extrudable material. Even when cold, the behaviour under deformation of products containing starch is generally plastic or brittle rather than elastic, and in this they depart from the properties expected from natural meat.

In accordance with the present invention, a food product comprises a meaty or other edible proteinaceous material, a moisture content lying between the respective moisture contents of dry foods and canned foods, and sufficient water-soluble material to exert a bacteriostatic effect together with sufficient heat coagulated edible protein to confer a coherent elastic texture on the product. It is typical of this product that it achieves and retains its elastic properties at elevated temperatures.

The water-soluble materials exert a bacteriostatic effect by reducing the "water activity" of the product as defined by the equation $a_w = P_s/P_o$ where $P_s$ is the vapour pressure of water in the product and $P_o$ is the vapour pressure of pure water at the same temperature. It is preferred that the water activity of the product should be in the range 0.65 to 0.85. Suitable water-soluble compounds include sugars, polyhydric alcohols, salts and acids. The preferred water-soluble materials are dextrose monohydrate, propylene glycol, sucrose, glycerol, sorbitol and sodium chloride. It is also preferred that an antimycotic should be included to suppress mould and fungal growth. Any antimycotic which is edible at the concentration employed may be used, but a combination of propylene glycol and potassium sorbate is preferred. The potassium sorbate may be present between 0.1 and 1.0% and propylene glycol at 0 to 18%, the preferred combination being 0.3% potassium sorbate, 3.0% propylene glycol.

The use of antimycotics can be avoided if the finished product is pasteurised, for example by irradiation, either after packing or before packing, where the packaging operations are carried out under mould-free conditions and with sterile packaging materials. Alternatively, a product without antimycotic may be pasteurised by heating the surface of the product in the packaged condition to a sufficient temperature to kill moulds and yeasts. When pasteurising in this way, we have found it desirable to have a solution of polyhydric alcohols and salts present to absorb and diffuse any water vapour generated by the heating process and which otherwise might condense to form localised areas of high water activity on the surface of the solid product.

By use of heat-coagulable protein, semi-moist products can be obtained which have a coherent, elastic, soft texture similar to that of raw meat. Furthermore, it has already been found possible to produce firm textured products having higher moisture levels than previously employed. Useful products are obtained with a moisture content from 15 up to 45%. The preferred moisture content is 30% but can vary in dependence upon the levels of soluble sugars, polyhydric alcohols and salts employed to depress the water activity. The pH value of the product may range between 4.4 and 8.0 but the preferred pH is 6.0 to 6.5.

Suitable heat-coagulable proteins are proteins which on heating in aqueous conditions are coagulated to a coherent elastic condition. Such proteins provide a tough elastic matrix in the product, especially where the product pH is 5.5 to 6.5. Especially preferred is vital wheat gluten, but other examples are dry blood plasma, soya protein isolate and egg albumen. The amount of coagulable protein employed may vary between 3 and 40% of the total weight of the product. The preferred concentration varies with the particular protein employed. For example, the preferred level of vital wheat gluten is 25 to 35% by weight.

The invention also provides a process for the production of a proteinaceous food product in which meaty or other proteinaceous materials and sufficient water-soluble substances to exert a bacteriostatic effect in the finished product are pasteurised, whereafter the heat-coagulable protein is added at a temperature below that at which it coagulates and the resulting mixture is then heated to coagulate the protein. Other desired ingredients may be added after pasturisation and before incorporation of the coagulable protein. These ingredients may be added together in the form of a solution and may include humectants, dyes, anti-oxidants and nutrient substances such as skimmed milk powder, minerals and vitamins. After the protein binding agent, for example dry vital wheat gluten, has been mixed vigorously with the other ingredients, the resulting dough is coagulated by heat, for example by spreading on to a tray and baking in a gas oven. Baking may be at any temperature from 45° to 235° C, for times between 1 and 60 minutes, but the preferred baking conditions are 130° to 150° C for 5 to 20 minutes. Other methods of heat coagulation may also be employed, such as microwave heating and extrusion cooking processes.

A dough including the coagulable protein may be stretched and then allowed to relax before baking, whereby a crinkled meat-like surface is produced. A further modification is the preparation of mixes of different colours, for example a red of "lean" coloured mix and a white of "fat" coloured mix, layers of the different coloured mixes being placed together before baking so that after coagulation of the protein the product has the appearance of muscle meat containing layers of fat.

A suitable pasteurising temperature is about 100° C and the mix is preferably allowed to fall to about 70° C before the coagulable protein is added. Where layers of different coloured mixes are to be brought together before baking, this may be done at any temperature from 20° to 85°, depending on the formulation of the different mixes, but will usually be about 50° C.

The possibility of stretching mixes containing heat-coagulable protein binders such as vital wheat gluten, so as to obtain distinctive textures in the product, represents a further advantage of the use of such binders. The mix before coagulation is soft and can readily be rolled and stretched. Such stretching gives a surface of the finished product of fine crinkled appearance closely resembling the cut muscle bundle appearance of sliced muscle meat. A similar effect may be obtained by subjecting partially heat-coagulated chunks of the product to microwave heating, when the chunks rapidly expand, for example to approximately double their original size, and at the end of the microwave energy application contract back to leave the desired crinkled surface appearance.

The final density of the product may be varied by altering the baking conditions employed. At lower temperatures a high density product with an elastic texture similar to that of raw muscle meat is obtained, whilst at higher temperatures an aerated product with the low density typical of lung may be produced. Intermediate effects may be obtained at temperatures between these extremes.

After the heat-coagulated product has been cooled, the resultant stable product may be presented much in the manner of pieces of meat for the user to cut or slice before feeding, for example, to a pet animal. Alternatively, the product may be cut or minced into pieces, preferably before cooling so as to avoid the clean, sharp edges obtained when the cold product is cut. Although it is desirable to cut or mince the product at above room temperature, this has the disadvantage that at the higher temperature the stickiness of the pieces is increased. To reduce stickiness and prevent the pieces from adhering to one another the product chunks may be sprayed with a thin film of arachis oil or similar edible oil or fat. If instead of heat-coagulable proteins, as provided for in this invention, cold-setting binding materials were to be included in the formulation, the product would be thermoplastic or liquid and sticky, and such cutting, slicing or mincing of the product while hot would be quite impossible.

Treatment of the cut pieces with edible oil or a stabilised aqueous solution also gives the product a moist, juicy surface appearance and improves pet animal acceptance. The stabilised solution may consist of humectants, for example polyhydric alcohols such as propylene glycol or glycerol, and water together with antimycotics such as potassium sorbate. It has been found that this solution is absorbed into the product chunks on storage at room temperature and that this also helps prevent the pieces from sticking together and creates a moist, juicy surface appearance. It is particularly advantageous to add flavouring materials to the stabilised solution since the flavour concentrates at the product surface and increases animal acceptance. The flavouring materials used may be comprised of meat extracts, protein hydrolysates and amino acid/sugar mixtures.

The oil used to coat the product is preferably arachis oil but may be any edible oil. The oil may be thickened, for example by the addition of aluminum stearate, to prevent the oil from separating from the chunks after spraying.

The stabilised solution, which may be added to the product in any proportion up to 30% solution: 70% product, preferably consists of glycerol, propylene glycol, salt, potassium sorbate and water at such levels as to give a water activity of 0.75 to 0.85. The solution may contain thickeners, such as starch or guar gum, and colouring agents, such as caramel, when a cooked meat gravy appearance is required, and colouring agents such as red dyestuffs or canthaxanthin when a blood-like liquid is required. Alternatively the solution may contain gelatin agents such as agar where a meat-in-jelly appearance is required.

In the present preferred method of producing the food product of this invention, finely comminuted meats and meat offals such as maws, tripe or liver are heated in the presence of sugars, such as dextrose, and/or polyhydric alcohols, such as glycerol, to 95°–100° C for 15 minutes in order to effect pasteruisation. A solution containing dyestuffs, humectants, such as propylene glycol, and anti-oxidants, such as butylated hydroxyanisole, is then mixed in, and this is followed by the addition of minerals, vitamins and such nutrients as skimmed milk powder. The mix temperature is preferably but not essentially allowed to fall to 70° C and the heat-coagulable binder, such as vital wheat gluten, blood plasma, soya protein isolate or egg albumen, are thoroughly mixed in. A mass of such a mixture coloured red or brown is rolled into a 1-inch thick slab with the random addition of layers of a mixture of similar formulation having the colour of white fat. The preferred ratio of meat mass : fat mass is about 92½:7½/ The slab is baked at 140° C for 15 minutes and after cooling to about 30° C is cut into ½ to ¾-inch chunks and sprayed with a coating of arachis oil to the extent of 1% of the product. The product is heat-sealed into nylonpolypropylene pouches.

The following are specific examples of the production of food products according to the invention.

EXAMPLE 1

| | | |
|---|---|---|
| 1. | Dextrose monohydrate | 25.0% |
| 2. | Pigs' maws (2 mm plate) | 38.0% |
| 3. | Glycerol | 3.0% |
| 4. | Propylene glycol | 3.0% |
| 5. | Butylated hydroxyanisole | 0.001% |
| 6. | 2% Chocolate brown HTS solution | 0.48% |
| 7. | 2% Red 2GS solution | 0.11% |
| 8. | 2% Red 6B | 0.08% |
| 9. | Skimmed milk powder | 1.7% |
| 10. | Dicalcium phosphate | 2.0% |
| 11. | Salt | 1.3% |
| 12. | Potassium sorbate | 0.3% |
| 13. | Vitamin mix | 0.15% |
| 14. | Mineral concentrate | 0.05% |
| 15. | Vital wheat gluten | 25.0% |

The product was prepared by mixing ingredients 1 and 2 together and heating by indirect steam to 95°–100° C for 15 minutes. Loss in weight was made good by addition of water at the end of this period. Ingredients 3–8 were mixed and added, followed by ingredients 9–14 which had been sieved and mixed prior to addition. The temperature of the mix was allowed to fall to 70° C and then the vital wheat gluten was rapidly mixed in. Twenty pounds of this dough-like mix was rolled out into a 1-inch layer with 1.6 pounds of a fat coloured dough prepared to a similar formula to that above except that dyestuffs (6, 7 and 8) were replaced by 0.025% of a 2% solution of Sunset Yellow Thin strips of the fat-coloured dough were rolled in.

The product was baked at 140° C for 15 minutes in a gas oven and allowed to cool almost to room temperature before being cut into ½ to ¾-inch chunks and sprayed with arachis oil at 1% of the total product weight.

The product was found to contain 33.0% moisture and to have a water activity of 0.85. Its acceptance by dogs was found to be high in relation to soft moist products of lower moisture content and its appearance and feel was judged to be very similar to that of raw muscle meat. When heat-sealed into plastic pouches of low water vapour transmission it had an extended storage life.

EXAMPLE 2

| | | |
|---|---|---|
| 1. | Pigs' maws | 46.8% |
| 2. | Glycerol | 16.0% |
| 3. | Propylene glycol | 1.2% |
| 4. | Butylated hydroxyanisole | 0.001% |
| 5. | 2% Chocolate brown HTS solution | 0.48% |
| 6. | 2% Red 2GS solution | 0.11% |
| 7. | 2% Red 6B solution | 0.08% |
| 8. | Dicalcium phosphate | 3.2% |
| 9. | Salt | 1.1% |
| 10. | Potassium sorbate | 0.3% |
| 11. | Vitamin mix | 0.15% |
| 12. | Mineral concentrate | 0.05% |
| 13. | Blood plasma | 5.3% |
| 14. | Vital wheat gluten | 25.5% |

The product was prepared in a similar manner to that described in Example 1, except that the glycerol and maws were indirect steam-heated together in a covered vessel to the boiling point and held at this temperature for 15 minutes, and that the blood plasma and vital wheat gluten were added together to the mix when the mix temperature had reached 70° C. The moisture content of the product was 38.0% and its water activity 0.84.

Chunks of the product readily retained their shape and identity when handled but had the soft, coherent, elastic texture and moist appearance of raw muscle meat, containing bands of soft, rather translucent fat-like material. The product was found to be highly palatable to pet animals and to be closely associated with real meat by the owners of the pets.

EXAMPLE 3

| | | |
|---|---|---|
| 1. | Dextrose monohydrate | 24.0% |
| 2. | Maws | 28.5% |
| 3. | Beef dripping | 2.0% |
| 4. | Propylene glycol | 3.0% |
| 5. | Chocolate brown HTS (2% solution) | 0.45% |
| 6. | Red 2GS (2% solution) | 0.10% |
| 7. | Red 6B (2% solution) | 0.075% |
| 8. | Butylated hydroxyanisole | 0.001% |
| 9 | Skimmed milk powder | 5.0% |
| 10. | Dicalcium phosphate | 3.0% |
| 11. | Sorbitol | 3.0% |
| 12. | Salt | 1.0% |
| 13. | Potassium sorbate | 0.3% |
| 14. | Vital wheat gluten | 30.0% |

The product was prepared according to Example 1 except that no oil was added to the chunks of finished product. The chunks were filled into clear plastic pouches along with a moisturising solution in the ratio of 8 parts chunks to 2 parts solution, and the pouches were then heat-sealed. The moisturing solution was comprised of:

| | |
|---|---|
| 53% | Glycerol |
| 2% | Propylene glycol |
| 1% | Salt |
| 0.3% | Potassium sorbate |
| 43.7% | Water |

On standing overnight the cubes were found to have absorbed half of the added solution and after 1 week the majority of the solution had been absorbed. The resultant product had the soft, moist, juicy appearance and texture of raw muscle meat.

EXAMPLE 4

| | | |
|---|---|---|
| 1. | Dextrose monohydrate | 21.0% |
| 2. | Pigs' maws | 24.9% |
| 3. | Beef dripping | 14.5% |
| 4. | Propylene glycol | 2.6% |
| 5. | Butylated hydroxyanisole | 0.001% |
| 6. | Chocolate brown HTS (2% solution) | 0.39% |
| 7. | Red 2GS (2% solution) | 0.09% |
| 8. | Red 6B (2% solution) | 0.07% |
| 9. | Skimmed milk powder | 4.4% |
| 10. | Dicalcium phosphate | 2.3% |
| 11. | Sorbitol | 2.6% |
| 12. | Salt | 0.9% |
| 13. | Potassium sorbate | 0.25% |
| 14. | Vitamin mix | 0.12% |
| 15. | Mineral supplement | 0.04% |
| 16. | Orthophosphoric acid | 0.3% |
| 17. | Vital wheat gluten | 25.5% |

The product was prepared as described in Example 1 except that the melted beef dripping and the phosphoric acid was added to the mix immediately prior to the gluten addition, no fat-coloured dough was added to the meat-coloured dough and no oil was added to the finished product chunks on packing. The product had a texture and appearance approaching that of corned beef, but on account of its relatively acid condition (pH about 5.5) it is of less marked elasticity than the product of the other Examples.

EXAMPLE 5

| | | |
|---|---|---|
| 1. | Pigs' maws | 28.5% |
| 2. | Dextrose monohydrate | 24.0% |
| 3. | Beef dripping | 2.0% |
| 4. | Propylene glycol | 3.0% |
| 5. | Butylated hydroxyanisole | 0.001% |
| 6. | Skimmed milk powder | 4.4% |
| 7. | Dried red blood cells | 1.0% |
| 8. | Dicalcium phosphate | 3.0% |
| 9. | Sorbitol | 3.0% |
| 10. | Salt | 1.0% |
| 11. | Potassium sorbate | 0.3% |
| 12. | Vital wheat gluten | 30.0% |

The mix was prepared as described in Example 1 except that the product was baked at 220° C for 30 minutes, when the product expanded to about double its original size. After cutting into ½ to ¾-inch chunks the product was packed into nylon polypropylene pouches with a gravy of the following composition:

| | |
|---|---|
| 50% | Glycerol |
| 3% | Propylene glycol |
| 1% | Salt |
| 0.3% | Potassium sorbate |
| 0.5% | Sodium carboxymethyl cellulose |
| 0.5% | Caramel |
| 1.0% | Flavouring |
| 9.7% | Water |
| 4.0% | Arachis oil |

The gravy: chunk ratio employed was 20 : 80.

The finished product chunks had a low density similar to that of lung and a fibrous internal texture. Overall the product resembled cooked fibrous meat in a meat gravy.

We claim:

1. A food product consisting essentially of a comminuted meat component; from 15 to 45% moisture; a water-soluble bacteriostatic component in a quantity sufficient to impart a water activity in the range of about 0.65 to about 0.85, and a coherent elastic matrix embedding said components and moisture comprising a heat-coagulated edible protein in an amount from about 25 to about 40% of the total weight of the product; said product having a sufficiently coherent elastic texture similar to that of raw meat for slicing into chunks.

2. A food product according to claim 1 wherein the heat coagulated protein is selected from the group consisting of coagulated wheat gluten, dry blood plasma, soya protein isolate and egg albumen.

3. A food product according to claim 1 wherein the water-soluble material is selected from the group consisting of sucrose, dextrose monohydrate, propylene glycol, glycerol, sorbitol and sodium chloride.

4. A food product according to claim 1 having a pH of 5.5 to 6.5.

5. A food product according to claim 1 in the form of cut pieces coated with at least one of an edible oil and a stabilized aqueous solution containing at least one of humectants, antimycotics and flavoring materials.

6. The food product according to claim 1 further including small quantities of additives selected from the group consisting of humectants, dyes, antimycotics, anti-oxidants, and nutrient substances.

7. A process for the production of a proteinaceous food product having a chewy elastic texture comprising the steps of: preparing a mix consisting essentially of a comminuted pasteurised meat component, moisture sufficient to provide 15 to 45% by weight moisture in the total product, and a bacteriostatic water soluble component in quantity sufficient to impart a water activity in the range of about 0.65 to 0.85; incorporating a heat-coagulable protein in said mix in an amount of about 25 to about 40% by weight of the total product at a temperature below that at which it coagulates; and heating the resulting mixture to coagulate the heat-coagulable protein to produce a coherent elastic matric embedding said components.

8. A process according to claim 7 wherein a solution comprising at least one of humectant, dyes, antioxidants and nutrient substances is added to the pasteurised meat component.

9. A process according to claim 7 wherein the mixture is baked at a temperature from 45° to 235° C for times between 1 and 60 minutes.

10. The process according to claim 9 wherein the heat-coagulable protein is wheat gluten.

11. A process according to claim 7 including the steps of: stretching said mixture including the heat-coagulable protein; and allowing said stretched mixture to relax before heating, whereby a crinkled meat-like surface is produced.

12. A process according to claim 7 including the steps of: applying microwave heating to partially heat-coagulated chunks of said mixture containing the coagulable protein to rapidly expand the chunks; and terminating said microwave energy application and allowing said chunks to contract back to acquire a crinkled surface appearance.

13. A process according to claim 7 wherein the meat component is pasteurised at about 100°C and the temperature of said mix is allowed to fall to about 70°C before the heat-coagulable protein is added.

14. A process according to claim 7 wherein layers of different coloured mixes containing heat-coagulable protein are brought together before heating to form a layered product at a temperature from 20° to 85°C.

15. The process according to claim 7 wherein the heat-coagulable protein is wheat gluten.

* * * * *